April 21, 1964  B. G. TAYLOR  3,129,905
AIRCRAFT HAVING WING WITH ARCUATE SHAPED TRAILING EDGE Filed Oct. 24, 1956  4 Sheets-Sheet 1

INVENTOR.
BRUCE G. TAYLOR
BY Oldham & Oldham
ATTYS.

April 21, 1964     B. G. TAYLOR     3,129,905
AIRCRAFT HAVING WING WITH ARCUATE SHAPED TRAILING EDGE
Filed Oct. 24, 1956     4 Sheets-Sheet 2

INVENTOR.
BRUCE G. TAYLOR
BY Oldham & Oldham
ATTYS.

April 21, 1964   B. G. TAYLOR   3,129,905
AIRCRAFT HAVING WING WITH ARCUATE SHAPED TRAILING EDGE
Filed Oct. 24, 1956   4 Sheets-Sheet 3
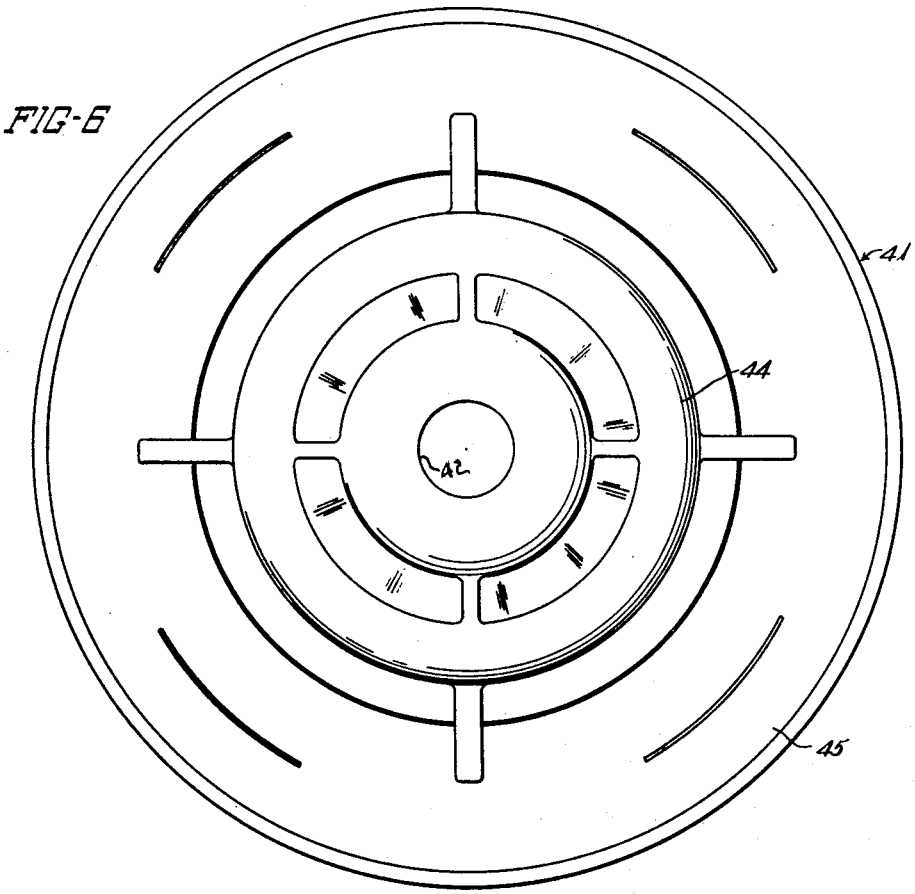
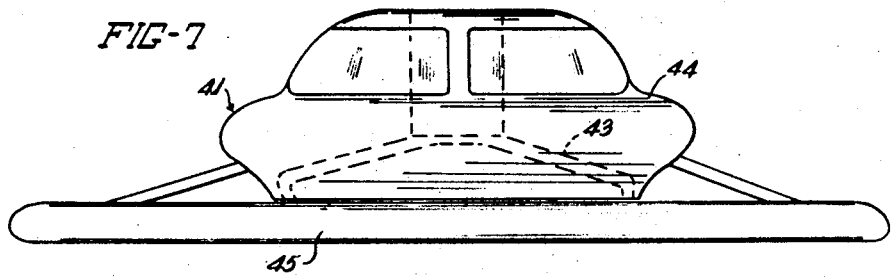
INVENTOR.
BRUCE G. TAYLOR
BY Oldham & Oldham
ATTYS INVENTOR.
BRUCE G. TAYLOR
BY Oldham & Oldham

ATTYS.

United States Patent Office 3,129,905
Patented Apr. 21, 1964

3,129,905
AIRCRAFT HAVING WING WITH ARCUATE
SHAPED TRAILING EDGE
Bruce G. Taylor, R.D. 3, Short Road, Alliance, Ohio
Filed Oct. 24, 1956, Ser. No. 617,951
7 Claims. (Cl. 244—42)

This invention relates to aircraft and particularly to a novel type of an aircraft having an arcuate shaped trailing edge in the wing and with some means being provided in the airplane for moving a stream of air over the wing surface and downwardly at the trailing edge thereof.

Heretofore there has been a great amount of development work done in providing various types of planes and a great amount of interest has been shown in the helicopter type of plane wherein the propeller rotates in a horizontal plane. However, most of such helicopters available today have been complex structures and have had a number of rather complicated controls provided therefor. These helicopters usually involve a rotating wing and with the pitch of such wing being variable to change the speed of movement of the helicopter and for other control purposes.

Aircraft have in the past been used rather extensively for crop dusting purposes and similar actions. However, helicopters are rather expensive to use for such action and ordinary propeller driven planes have such a high rate of speed with relation to the crops or other products being treated, so as to be difficult to control.

It therefore is a general object of the present invention to provide a new and improved type of an aircraft utilizing a wing having an arcuate shaped trailing edge and characterized by the simplicity of construction and effective functioning thereof.

Another object of the invention is to provide an aeronautical vehicle including an air movement member for forcing a stream of air downward past the trailing edge of an air foil section, or wing, which member also produces a flow of air over the wing or air foil section.

Another object of the invention is to provide a novel aircraft of the type described wherein a propeller or equivalent member produces a column of air that passes by the arcuate trailing edge of the air foil section to induce a suction causing air to flow over the wing element into the air column and produce a high lifting action in the aircraft.

Yet further objects of the invention are to provide boundary layer slots in the upper surface of the air foil section or wing element and extending to the trailing edge of such element for creating extra high lift action; to provide a wing element of any convenient outer shape and to provide a trailing edge in the wing segment of arcuate shape, or circular in shape, as desired; and to avoid the use of costly gearing and pitch changing devices in a helicopter-like structure.

Yet another object of the invention is to provide an aeronautical vehicle of the class described wherein single or multiple propellers are mounted in horizontal planes with the propeller tips substantially even with, but not touching, the trailing arcuate edge of a wing; or else mounted immediately above the trailing edge of the wing element to produce a column of air at high speed for flow over and downwardly of the trailing edge of the wing element.

Another object of the invention is to use any desired type of an air propelling means in an aircraft of the class described and wherein a turbine, jet air stream, or other means can be used as well as conventional propellers for moving air over the trailing edge of a wing element.

Still another object of the invention is to provide an air intake slot in the leading edge of an aircraft wing segment to aid in obtaining high lift action therein even with low speed air movement of such air foil.

The foregoing and other objects and advantages of the invention will be made more apparent as the specification proceeds.

Attention now is particularly directed to the accompanying drawings wherein:

FIG. 6 is a top plan of yet another modification of the aircraft of the invention and utilizing air jet means therein;

FIG. 7 is a side elevation of the aircraft of FIG. 6;

When referring to corresponding parts shown in the drawings and referred to in the specification, corresponding numerals are used to facilitate comparison therebetween.

Figure 1:
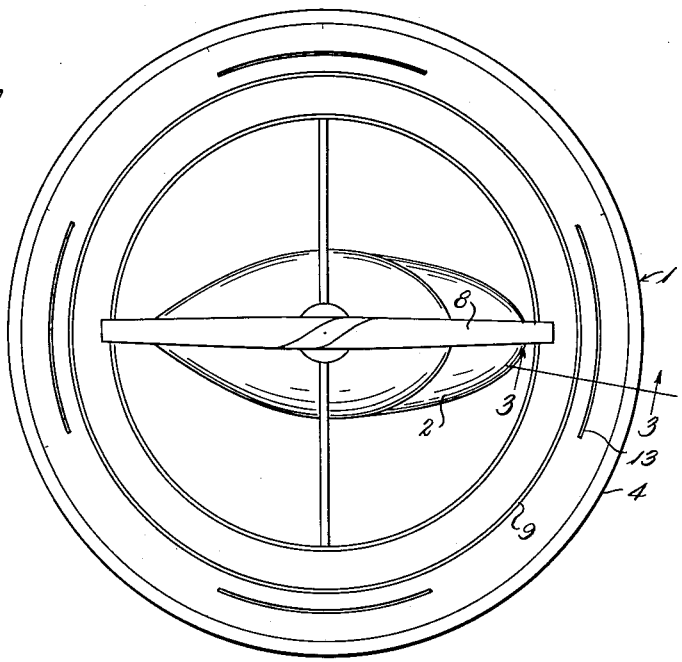
FIG. 1 is a plan view of an aeronautical vehicle embodying the principles of the invention.

The present invention, broadly speaking, relates to an aircraft having a wing with a standard air foil section with it having a trailing edge of arcuate shape in length, a fuselage secured to the wing, means for creating and providing flow of air over said wing and downwardly at the trailing edge thereof, a plurality of individual spoilers pivotally positioned in the wing at circumferentially spaced portions thereof, which wing has substantially vertically extending slots therein for receiving the spoilers when inoperative, and means for individually moving the spoilers from the slots upwardly above the wing surface to break up air flow over the wing and provide controls for movement of the aircraft, as desired.

Attention now is directed to the details of the structure shown in the drawings, and an aircraft or aeronautical vehicle of the invention is indicated as a whole by the numeral 1. This aircraft 1 has a fuselage 2 provided therein and any desired type of a support or running gear 3 is provided therefor. Inasmuch as the aircraft 1 of the invention is particularly adapted for vertical landings and takeoff, it is not necessary to provide the ordinary wheeled running gear in most instances.

As an important feature of the invention, an aircraft wing 4 of circular shape is provided and this wing 4 has a trailing edge of arcuate shape at all portions thereof. The wing 4 is in general of standard air foil section and has several other novel features provided therein, as will be pointed out hereafter in more detail. The wing 4 is supported on and secured to the fuselage 2 by means of a spider-like connecting frame 5.

The aircraft 1 has any conventional type of a motor 6 provided therein and suitable shaft and gear means connect the motor 6 to the vertically extending shaft 7 on which a propeller 8 is secured and which is journalled on the frame 5 by conventional means. This propeller 8 is of conventional design and is adapted to rotate in a horizontal plane and with the tips of the propeller blade lying immediately adjacent, but slightly above, the trailing edge of the wing 4 at all parts thereof. Thus rotation of the propeller 8 will force a blast of air downwardly through the center portion of the wing 4 and will force or cause air to move over all of the air foil surfaces of this wing 4.

It is within the concept of the invention to use a relatively simple or inexpensive type of a motor 6, and one like that used in an outboard motor could, for example, be used and with the output shaft from such motor being directly connected to the hub 7 for driving the propeller 8, if desired.

Figure 3:
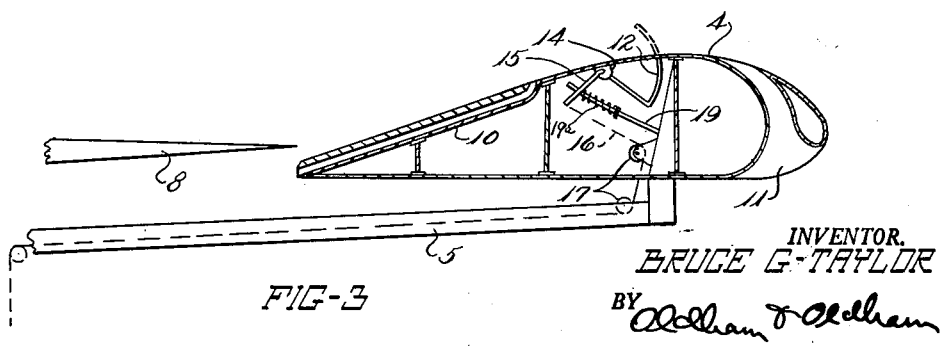
FIG. 3 is an enlarged fragmentary section, taken on line 3—3 of FIG. 1, through the air foil member of the aircraft of FIGS. 1 and 2.

The aircraft wing 4 of the invention has other important features provided therein to aid in providing for circulation of air, or air flow over such wing 4 as best indicated in FIG. 3 of the drawings. As a feature of this structure, I provide a special boundary layer slot 9 which extends completely around the periphery of the wing 4 except for reenforcing members or other positioning means provided therein. This boundary layer slot 9 opens into an elongate, but flat, boundary layer duct 10 as shown in FIG. 3. Such boundary layer duct 10 in general lies substantially parallel and close to the upper surface of the wing 4 and terminates at the trailing edge of the wing 4. The duct 10 may comprise the entire wing section between the boundary layer slot 9 and an exit slot formed at the trailing edge of the wing. The section of the wing 4 in advance of the slot 9 would be positioned off to separate it from the duct section thereof. By this construction, I am able to separate the boundary layer of air, which is ⅛ to ½ inch thick, continuously flowing from the under surface of, past the leading edge of the wing, and over the upper surface of the wing 4. Thus I can increase the lifting action of the wing 4 by this slot and duct means as outlined herein.

Yet a further feature of this wing 4 is that an intake slot 11 is provided in the lower surface of the wing 4 immediately adjacent the front edge or nose portion thereof. Such slot 11 gradually decreases in depth from the leading lower end thereof and in general aids in providing air flow over the wing 4 and provision of lift in the wing even though the aircraft 1 is traveling at relatively low speed. Such slot 11 normally extends completely around the periphery of the wing 4 and is only interrupted by suitable frame and brace means required for securing the nose component of the wing 4 to the remainder thereof. This slot 11 is shown of relatively wide or deep shape, especially because of a parachute or high lift effect produced by air forced through the slot and over the top edge of the wing when failure of the power means for the aircraft occurs.

The boundary layer duct 10, of whatever form it comprises, may terminate in a slot in the trailing edge of the wing, or it may be at the top or bottom margin of the trailing edge.

It will be seen that chords of the wing 4 lie in a plane which is approximately horizontal.

The flying action of the aircraft 1 is controlled by some type of an air flow spoiler or breaker member. In this instance, an arcuate breaker or spoiler 12 is shown in FIG. 3. The spoiler 12 is provided with an inoperative, retracted position wherein it is received in an arcuate slot 13 provided in a portion of the wing 4. Several spoilers 12 are provided at circumferentially spaced portions of the wing 4 and usually are approximately 90° apart from each other so that four spoilers are provided around the periphery of the wing. These spoilers 12 are preferably pivoted on means such as brackets 14 within the wing 4, and have control arms or links 15 extending therefrom and usually fixedly secured to each of the spoilers 12. These links 15 have suitable means such as cable controls 16 connected thereto and extending over suitable pulleys or guides 17 to a conventional pivotal control arm 18 within the cockpit of the fuselage 2. A suitable guide bar 19 is associated with the spoilers 12 and a coil spring, for example, is positioned adjacent each of the links 15 on the guide bar 19 for urging the spoiler 12 to inoperative, or retracted position, but with the pilot being able to operate the control arm 18 at any desired time and raise either the spoiler 12, as shown, or one diametrically opposed thereto. There usually are two completely independent cable and control arm units provided for controlling the pairs of spoilers 12 on diametrically opposed portions of the wing 4. Usually these control cables 16 and associated means may extend through the spider-like frame means 5.

A vertically extending rudder 21 is provided at one or the trailing portion of the fuselage 2 and it is pivotally secured at its forward edge by conventional means to the fuselage 2 and frame 5 for pivotal movement with relation thereto. Thus normally a pair of control cables 22, only one of which is shown, would connect to opposite sides of the rudder 21 and extend through the fuselage over suitable control and guide means to a control lever 23 so that by movement of such lever or other control member from side to side or laterally of the fuselage 2, the rudder 21 can be caused to swing back and forth for guiding horizontal movement of the aircraft 1. In order to aid in controlling the position of the aircraft 1 on vertical movement thereof, a trim tab 24 is provided and is pivotally secured adjacent its upper end to the frame 5 or other equivalent means in the aircraft. Thus any suitable control means (not shown) can be provided for such a tab, to swing it about a horizontal axis to control the position of the aircraft 1 as it is ascending or descending.

Figure 4:
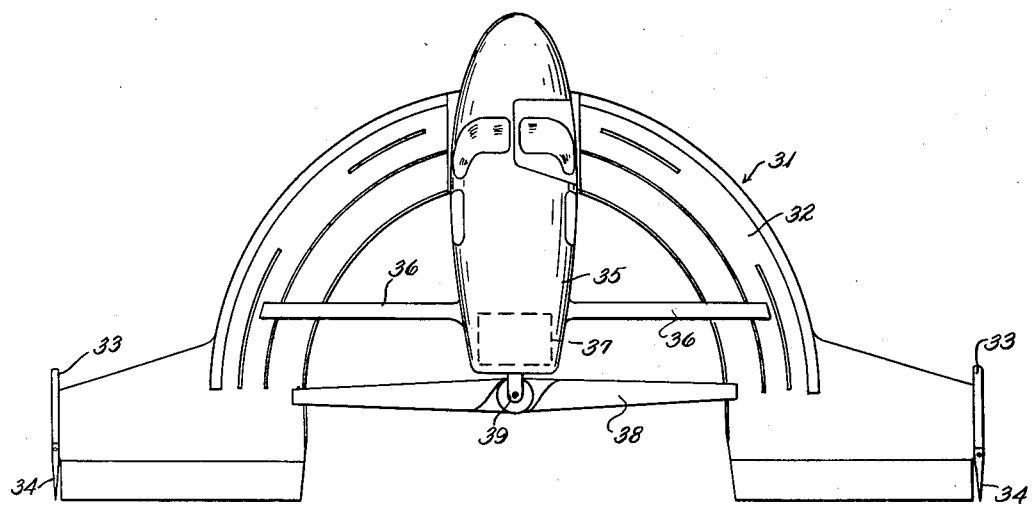
FIG. 4 is a plan view of a modified type of an aeronautical vehicle of the invention.
Figure 5:
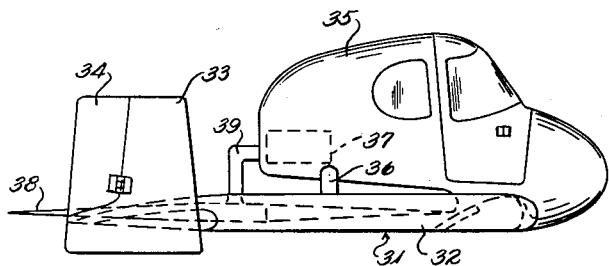
FIG. 5 is a side elevation of the vehicle of FIG. 4.

FIGS. 4 and 5 show a different embodiment of the aircraft of the invention wherein an aircraft 31 is provided and it has a wing section 32 which is of substantially 180° arcuate contour at its rear or trailing edge. This wing 32 may have a pair of fixed laterally spaced vertically extending stabilizer fins 33 and vertically extending rudders 34 thereon at the edges of the wing 32 to aid in control of the flight of the aircraft. In this embodiment of the aircraft, the fuselage 35 is secured to the wing 32 by a suitable laterally extending frame member 36, as well as other means at the juncture point of the wing and fuselage at the forward portion of the plane. A motor 37 connects to a horizontally positioned propeller 38 by conventional gear and shaft means and housing assembly, all as indicated as a whole by the number 39. Thus this propeller 38, when driven, will operate to cause a stream of air to flow over and downwardly of the wing 32 and pull other air over such wing. Four spoiler or breaker members are positioned at about 60° from each other on the wing 32 which is of the same general construction as the wing 4.

FIGS. 6 and 7 show yet another type of an aircraft 41 of the invention. In this instance, the aircraft 41 is adapted for jet operation and with some suitable burner type of a motor being provided, as indicated at 42, to provide an air stream which will pass through suitable control ducts 43 and pass out directly downwardly, substantially, of the fuselage 44 of this plane. Again, a completely circular wing 45 is provided and in this instance, the ducts 43 would be provided substantially continuously except for positioning or frame means around the trailing edge of such wing 45 to provide the desired downward blast of air at the trailing edge of the wing.

Figure 2:
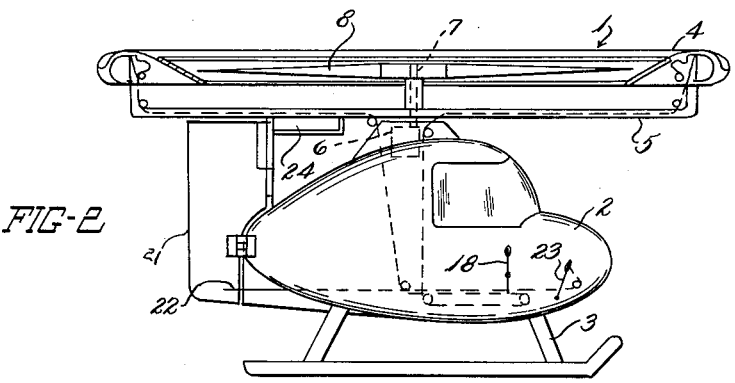
FIG. 2 is a side elevation of the aeronautical vehicle of FIG. 1.

These aircraft 31 and 41 as disclosed herein preferably have the same type of spoilers, controls, boundary layer ducts, and leading edge ducts in the wings thereof as referred to in the aircraft shown in FIGS. 1 through 3 hereof.

It should be noted that the aircraft of the invention are not shown completely from a working engineering viewpoint, but that sufficient details and elements of the aircraft have been shown to illustrate the construction of an operative embodiment in accordance with the principles of the present invention. In general, any controls or other members not shown completely herein are of conventional construction and are omitted to clarify and sharpen the disclosure of the present invention.

It is believed that the arcuate trailing edge type of a wing as disclosed by applicant herein is a novel type of a construction which would provide very desirable results in aircraft particularly suited for rising and descending substantially vertically and having limited forward speeds. As the spoiler on any one surface, or part of the wing would be raised, the aircraft would slide through the air in that direction. By the use of the novel boundary layer slot provided in any portion of the upper surface of the wing of the aircraft, the boundary layer of air is withdrawn from the air foil surfaces and will facilitate obtaining maximum lift and efficiency from air passing over the air foil contour.

Figure 8:
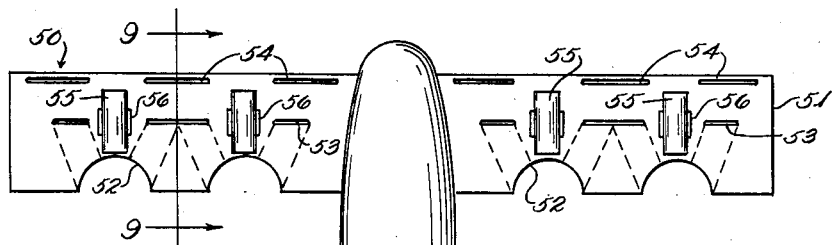
FIG. 8 is a plan view of a further modified aeronautical vehicle embodying the principles of the invention.

FIG. 8 of the drawings shows a further type of an aeronautical vehicle indicated in general by the numeral 50 which vehicle has a wing 51 provided thereon that is of general air foil contour in vertical section. At the trailing edge of this wing 51, a plurality of arcuate lifting sections 52 are provided, each of which has a means directly associated therewith for providing, creating or propelling an air stream or air blast over and downwardly of the wing 51 and particularly the arcuate lifting sections 52 thereof. These sections 52 can be of any desired arcuate length, but in order to get efficient lifting action therefrom, it is thought that they, usually, should be of approximately 160°, or more, for best action in accordance with the teachings of the invention.

Figure 9:
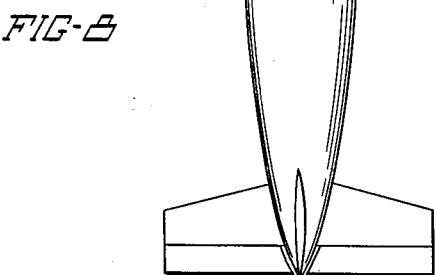
FIG. 9 is an enlarged vertical section taken on line 9—9 of FIG. 8.

FIG. 9 of the drawings illustrate that the same type of boundary layer slots 53, as in the other forms of the invention preferably are provided as in the other embodiments of the invention and with such slots 53 connecting to the arcuate sections 52 in the trailing edge of the wing. These boundary layer edge slots 53 can be of any desired length laterally of the wing 51 and are shown at spaced portions of the wing, while nose intake slots 54 of the aircraft likewise are of similar contour to those shown in the other embodiments of the invention are and extend along any desired portions of the wing 51.

In this particular embodiment of the invention, I have shown a jet engine 55 associated with each of the arcuate trailing edge wing sections 52 for directing a stream of air across and downwardly of such wing section for the lifting action as described hereinbefore. These jet engines 55 can be mounted on the wing 51, as by means of brackets 56, and the engines have conventional control means, fuel supply means, etc. (not shown) provided therefor. If desired, the jet engines 55 could be positioned in a vertically adjustable or pivotal manner on the brackets 56 so as to give the desired vertical blast of air downwardly onto the trailing edges of the wing 51. These jet engines 55 could be positioned at any desired front to rear relation to the arcuate lifting sections 52.

Conventional rudders, ailerons, tail fins, etc. can be provided on the fuselage 55 of this aircraft 50 for controlling the flight thereof.

Figure 10:
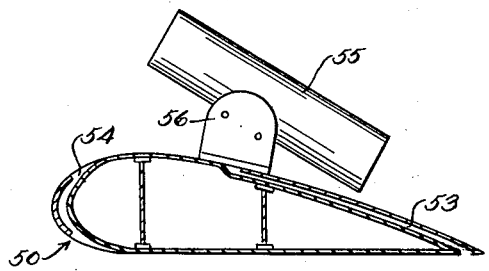
FIG. 10 is a diagrammatic plan view of a further modification of the aircraft of the invention.

FIG. 10 shows yet a further modification of the invention wherein an aircraft vehicle 60 is indicated and shown. This aircraft 60 has a 360° annular trailing edge 61 provided in the wing section 62 provided thereon. Preferably the fuselage for such aeronautical aircraft 60 is suspended therefrom like the fuselage 2 for the aircraft 1 shown in FIGS. 1 through 3 hereof.

If desired, boundary layer slots and nose slots, as described hereinbefore, may be provided in the wing 62 at any desired portions thereof. FIG. 10 indicates that spoilers 63 are carried by the wing 62 and are movable up to positions to extend therefrom, or to be recessed into the surfaces of the wing 62, as in the wing 4 of the aircraft 1 referred to hereinbefore. Thus the direction of movement of the aircraft can be controlled by individual movement of the spoilers 63.

A propeller 64 is shown positioned on a part of a frame 65 for this aircraft 60 and such propeller 64 is adapted to be rotated at a desired speed immediately adjacent to the trailing edge surface 61 of this wing 62, all as explained hereinbefore with relation to the aircraft shown in FIGS. 1 through 3. This wing 62 is of any desired or standard air foil contour from front to trailing edge thereof. In all events, a blast of air is forced over and downwardly with relation to the trailing edge 61 of the wing to give the desired lifting action thereto.

It will be realized that in some instances, the leading or outer edge of the wing 62 in an aircraft of the invention may be of triangular shape but the trailing edge of the wing would be of arcuate shape to extend over at least 160°, or the trailing edge could be completely within the wing section and comprise a 360° trailing edge, as in some of the modifications of the invention shown herein.

While several complete embodiments of the invention have been disclosed herein, it will be appreciated that modification of these particular embodiments of the invention may be resorted to without departing from the scope of the invention as defined in the appended claims.

What is claimed is:

1. An aircraft comprising an annular wing having a standard air foil section but having an inner trailing edge of arcuate shape of 360° in length, a fuselage secured to and positioned below and spaced from said wing, and means for creating and providing flow of air inwardly over the upper surface of said wing and downwardly past the trailing edge thereof, said means comprising a driven propeller the tips of which are positioned to overlap the trailing edge of said wing and to be positioned immediately thereabove.

2. An aircraft comprising a wing having a substantially standard air foil section and having a portion on an inner trailing edge of arcuate shape of any portion of a circle, a fuselage secured to and positioned below said wing, means carried by said fuselage but positioned adjacent said wing for providing a flow of air over said wing and downwardly past the said arcuate portion of the trailing edge thereof, and means carried within said wing but movable therefrom for interrupting the flow of air thereover.

3. An aircraft as in claim 2 having at least one leading edge slot in said wing of decreasing size from the lower to the upper end thereof through which air is drawn from in front of and below said wing over to the top surface of said wing by means of an impelled column of air which passes to and by the arcuate inner trailing edge of said wing.

4. An aircraft comprising a generally externally ring shaped wing defining a plane and having a substantially standard air foil section and having an inner trailing edge of circular shape of 360° in length, frame means connected to said wing, a fuselage secured by said frame means to said wing, horizontally rotatable propeller means journalled on said frame means and with the tips of said propeller overlapping the trailing edge of said wing and being positioned immediately thereabove, means for driving said propeller to provide a flow of air over said wing and downwardly past the trailing edge thereof, said wing having a leading edge slot therein extending upwardly and rearwardly of the wing from the lower surface of said wing at the leading edge thereof through which air is drawn over to the top surface of said wing by means of the impelled column of air which passes to and by the trailing edge of said wing, said leading edge slot being of maximum size at the lower air entrance end thereof.

5. An aircraft comprising a generally externally ring shaped wing defining a plane and having a substantially standard air foil section and having an inner trailing edge of circular shape of 360° length, frame means connected to said wing, a fuselage secured by said frame means to said wing and positioned below and spaced vertically from said wing, horizontally rotatable propeller means journalled on said frame means and with the tips of said propeller means overlapping and being directly adjacent the trailing edge of said wing and being positioned immediately thereabove, and means for driving said propeller means to provide a flow of air over the upper surface of said wing and downwardly past the trailing edge thereof, all portions of the aircraft being in the plane of said wing or being below said wing, said wing having a leading edge slot therein extending upwardly and rearwardly of the wing from the lower surface of said wing at the leading edge thereof through which air is drawn over to the top surface of said wing by means of the impelled column of air which passes to and by the trailing edge of said wing, said wing also having boundary layer slot and duct means therein connecting parts on the upper surface of the wing to the trailing edge thereof.

6. An aircraft comprising a ring shaped wing defining a plane and having a substantially standard air foil section and having an inner trailing edge of circular shape of 360° in length, frame means connected to said wing, a fuselage secured by said frame means to said wing and positioned below and spaced vertically from said wing, a horizontally rotatable propeller journalled on said frame means and with the tips of said propeller overlapping the trailing edge of said wing and being positioned immediately thereabove, said wing and said propeller being the upper members in the aircraft to leave said wing substantially unobstructed in the open center thereof for flow of air down into such open center, means for driving said propeller to provide a flow of air over said wing and downwardly past the trailing edge thereof, said wing having a leading edge slot therein extending upwardly and rearwardly of the wing from the lower surface of said wing at the leading edge thereof, through which air is drawn over to the top surface of said wing by means of the impelled column of air which passes to and by the arcuate trailing edge of said wing, said wing also having boundary layer slot and duct means therein connecting parts on the upper surface of the wing to the trailing edge thereof, and means receivable within said wing but movable to protrude thereabove for interrupting flow of air thereover.

7. An aircraft comprising an annular wing having a substantially standard uniform air foil section throughout and having an unobstructed radially inner trailing edge of 360° extent and of lesser thickness than the leading edge for free flow of air thereover, a fuselage secured to said wing and positioned below and spaced therefrom, and driven propeller means adjacent and above the trailing edge of said wing and positioned on said fuselage for forcing air against and downwardly past only a portion of said wing including said trailing edge and for causing only induced air flow over the leading edge of the wing.

References Cited in the file of this patent
UNITED STATES PATENTS

| | | |
|---|---|---|
| 1,353,666 | Page | Sept. 21, 1920 |
| 1,782,878 | O'Massey | Nov. 25, 1930 |
| 1,890,012 | Alfaro | Dec. 6, 1932 |
| 2,169,325 | Novak | Aug. 15, 1939 |
| 2,219,234 | Messerschmitt | Oct. 22, 1940 |
| 2,468,787 | Sharpe | May 3, 1949 |
| 2,532,482 | Custer | Dec. 5, 1950 |
| 2,547,266 | Hoglin | Apr. 3, 1951 |
| 2,661,167 | Clark | Dec. 1, 1953 |
| 2,716,528 | Hammock | Aug. 30, 1955 |
| 2,718,364 | Crabtree | Sept. 20, 1955 |
| 2,843,339 | Streib | July 15, 1958 |
| 2,876,964 | Streib | Mar. 10, 1959 |

FOREIGN PATENTS

| | | |
|---|---|---|
| 494,895 | Italy | June 5, 1954 |